United States Patent
Seng et al.

(10) Patent No.: US 10,056,108 B1
(45) Date of Patent: Aug. 21, 2018

(54) DETERMINING BIT ASPECT RATIOS FOR INTERLACED MAGNETIC RECORDING TRACKS

(71) Applicant: Seagate Technology LLC, Cupertino, CA (US)

(72) Inventors: Edmun Chian Song Seng, Singapore (SG); Det Hau Wu, Singapore (SG); Lin Nah Lim, Singapore (SG); Jose Mari Corral Toribio, Singapore (SG); Luh Chyuan Lau, Singapore (SG); Utt Heng Kan, Singapore (SG); Meng Suan June Lee, Singapore (SG)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/641,547

(22) Filed: Jul. 5, 2017

(51) Int. Cl.
  *G11B 5/09* (2006.01)
  *G11B 20/10* (2006.01)
  *G11B 5/00* (2006.01)

(52) U.S. Cl.
  CPC .......... *G11B 20/10222* (2013.01); *G11B 5/09* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 6,957,379 B1 | 10/2005 | Patapoutian et al. | |
| 7,102,838 B2 | 9/2006 | Kim et al. | |
| 8,477,569 B2 | 7/2013 | Erden et al. | |
| 8,797,672 B2 | 8/2014 | Tanabe et al. | |
| 8,842,503 B1* | 9/2014 | Rausch | G11B 5/09 369/13.02 |
| 8,854,929 B1 | 10/2014 | Champion et al. | |
| 8,896,961 B1* | 11/2014 | Harllee, III | G11B 5/596 360/75 |
| 8,941,937 B1* | 1/2015 | Toribio | G11B 5/012 360/31 |
| 9,111,578 B1* | 8/2015 | Hassel | G11B 20/1217 |
| 9,153,272 B1 | 10/2015 | Rausch et al. | |
| 9,280,987 B1* | 3/2016 | Bao | G11B 20/1217 |
| 9,311,951 B1 | 4/2016 | Chu et al. | |
| 9,330,688 B1 | 5/2016 | Zhu et al. | |
| 9,355,671 B2 | 5/2016 | Rausch et al. | |
| 9,570,104 B1* | 2/2017 | Erden | G11B 20/10009 |
| 9,589,587 B1 | 3/2017 | Chu et al. | |

(Continued)

*Primary Examiner* — Peter Vincent Agustin
(74) *Attorney, Agent, or Firm* — Hollingsworth Davis, LLC

(57) ABSTRACT

A method involves determining bit aspect ratios for interlaced tracks written to a magnetic recording medium. The interlaced tracks include top tracks that are written partially overlapping and interlaced with bottom tracks. Isolated test tracks are written at first different bit aspect ratios to determine a top bit aspect ratio that achieves a first target areal density for the isolated test tracks. Interlaced test tracks are written at second different bit aspect ratios to determine a bottom bit aspect ratio that achieves a second target areal density for the interlaced test tracks. Top test tracks of the interlaced test tracks are written at the top bit aspect ratio. The top and bottom bit aspect ratios are selected to subsequently write interlaced tracks on the magnetic recording medium.

13 Claims, 7 Drawing Sheets

(56) References Cited

U.S. PATENT DOCUMENTS

| | | | |
|---|---|---|---|
| 9,704,519 B1* | 7/2017 | Zhu | G11B 5/455 |
| 2007/0230010 A1* | 10/2007 | Jin | G11B 5/02 360/69 |
| 2009/0002866 A1* | 1/2009 | Shaver | G11B 5/012 360/51 |
| 2011/0096436 A1* | 4/2011 | Albrecht | G11B 5/855 360/135 |
| 2011/0205861 A1 | 8/2011 | Erden et al. | |
| 2011/0228651 A1 | 9/2011 | Gage et al. | |
| 2015/0009787 A1* | 1/2015 | Rausch | G11B 5/09 369/13.26 |
| 2015/0332725 A1 | 11/2015 | Rausch et al. | |

\* cited by examiner

DETERMINING BIT ASPECT RATIOS FOR INTERLACED MAGNETIC RECORDING TRACKS

SUMMARY

Various embodiments described herein are generally directed to determining bit aspect ratios for interlaced magnetic recording tracks. In one embodiment, a method involves determining bit aspect ratios for interlaced tracks written to a magnetic recording medium. The interlaced tracks include top tracks that are written partially overlapping and interlaced with bottom tracks. Isolated test tracks are written at first different bit aspect ratios to determine a top bit aspect ratio that achieves a first target areal density for the isolated test tracks. Interlaced test tracks are written at second different bit aspect ratios to determine a bottom bit aspect ratio that achieves a second target areal density for the interlaced test tracks. Top test tracks of the interlaced test tracks are written at the top bit aspect ratio. The top and bottom bit aspect ratios are selected to subsequently write interlaced tracks on the magnetic recording medium.

In another embodiment, isolated test tracks are written to determine a first areal density function for top tracks of a magnetic recording medium. The top tracks partially overlap and are interlaced with bottom tracks. The first areal density function is based on different first laser powers and first linear bit densities that achieve a first target bit error rate for the isolated test tracks. A value $LDI_{top}$ of the first laser powers and a value $BPI_{top}$ of the first linear bit densities are selected that result in a first target value of the areal density function. Interlaced test tracks are written to determine a second areal density function of the bottom tracks based on different second laser powers and second linear bit densities that achieve a second target bit error rate for bottom test tracks of the interlaced test tracks. Top test tracks of the interlaced test tracks are written at $LDI_{top}$ and $BPI_{top}$. Based on the writing of the interlaced tracks, a value $LDI_{bottom}$ of the second laser powers and a value $BPI_{bottom}$ of the second linear bit densities are selected that result in a second target value of the second areal density function. The $LDI_{top}$, $BPI_{top}$, $LDI_{bottom}$, and $BPI_{bottom}$ are subsequently used to respectively record the top and bottom tracks on the magnetic recording medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
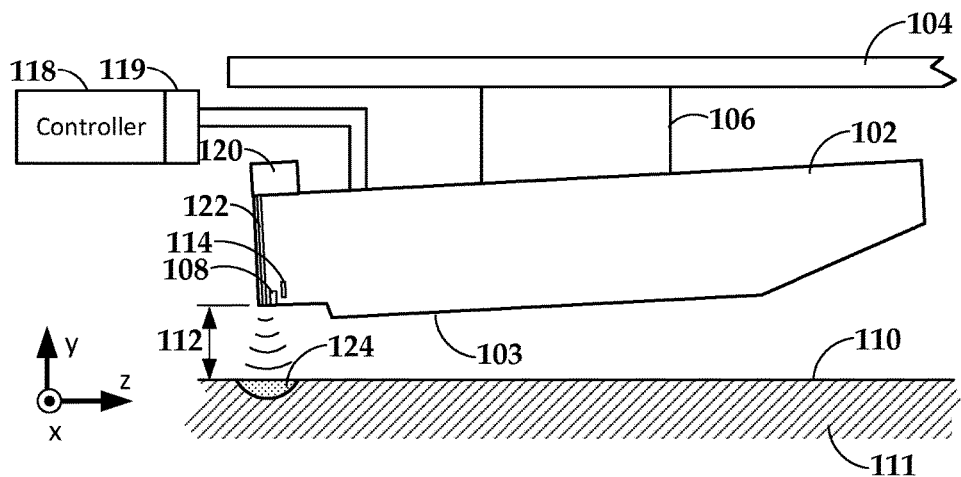
FIG. 1 is a diagram illustrating shingled magnetic recording according to an example embodiment.

The present disclosure generally relates to data storage devices that utilize magnetic storage media, e.g., disks. Data storage devices described herein may use a particular type of magnetic data storage known as heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers the magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing magnetic coercivity therefore reducing the writing magnetic field required for high-density recording. A waveguide integrated into a read/write head can be used to deliver light to the near-field transducer. Light from a light source, such as an edge-emitting laser diode, is coupled into the waveguide through waveguide input coupler or a spot size converter. The light source may be mounted to an outside surface of the read/write head.

In addition to HAMR, other schemes have been developed to increase areal density for HAMR as well as for conventional, perpendicular recording heads and media. These schemes, such as shingled magnetic recording (SMR) and interlaced magnetic recording (IMR) generally involve writing some tracks that partially overlap previously written tracks. In conventional perpendicular recording drives, tracks are written apart from one another, e.g., separated by a guard band, to reduce adjacent track interference (ATI). While adjacent track separation allows tracks to be updated independently, it can limit the number of tracks that can be written in view of other factors such as the size and strength of the magnetic field needed for writing.

One capability that HAMR has that is different than conventional recording is that the ability to change track width over a relatively large range. This is because the track width is controlled by the hotspot size, which can be varied by changing power applied to the laser. The length of the bit on the track can be changed by changing the write signal (e.g., changing clock frequency). In this way, the bit aspect ratio (BAR) can be selected from a range of values by changing laser power and write channel clock. A variable BAR (VBAR) can be used to tailor performance of the media, e.g., maximize areal density, reliability, etc.

When HAMR is used together with a format such as IMR, the selection of VBAR can be more complicated. Generally, IMR involves first writing bottom tracks and then writing top tracks interlaced between the bottom tracks. Both bottom and top tracks can have different VBAR values, and such values can affect the interaction between the top and bottom tracks. In the disclosure below, methods and apparatuses are described that can effectively set VBAR for a HAMR IMR storage device. While embodiments described below achieve VBAR by changing a HAMR laser power and clock frequency of a magnetic writer signal, VBAR may be obtained by varying other values. For example, changing maximum writer current can affect track width, and in this way some level of VBAR may be achieved without HAMR. The methods described below may be applicable to these other VBAR writing techniques as well.

In FIG. 1, a block diagram shows a side view of a HAMR read/write head 102 according to an example embodiment. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic coil and pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions.

Figure 2:
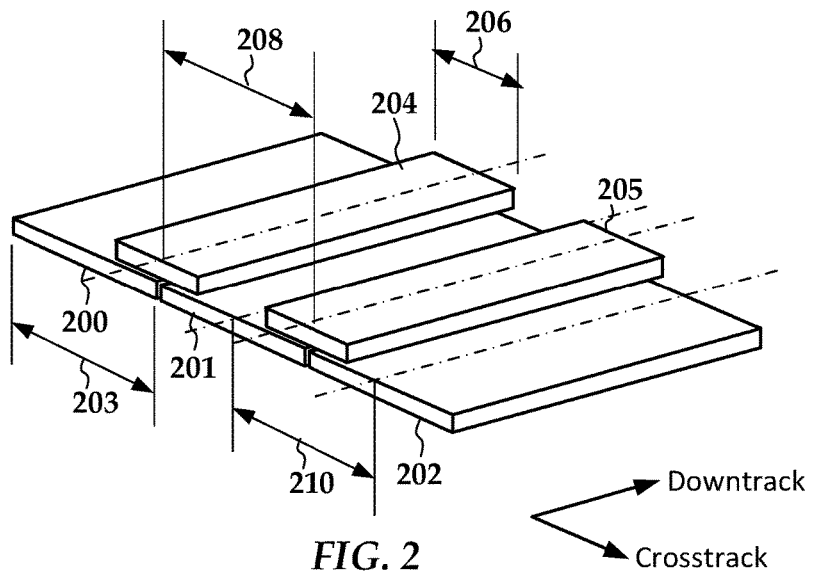
FIG. 2 is a diagram illustrating interlaced magnetic recording tracks according to an example embodiment.

In FIG. 2, a block diagram illustrates IMR tracks according to an example embodiment. In this IMR process, bottom tracks 200-202 are first written the recording medium using a bottom track width 203 and at bottom track pitch 210. Top tracks 204, 205 are then written partially overlapping between respective bottom tracks 200-202, and therefore are interlaced between the bottom tracks 200-202. The top tracks are written at a top track width 206 and at top track pitch 208.

Because the bottom tracks 200-202 are written at a relatively large cross-track separation from one another, the bottom tracks 200-202 can be written using a relatively larger width 203 than the top tracks 204, 205 without risk of adjacent track erasure. The larger width 203 enables recording the bottom tracks 200-202 at relatively higher linear bit density than that of the top tracks 204, 205. For a HAMR device, the different widths 203, 206 can be achieved by varying laser power to vary the size of the hotspot in the recording medium. The width and linear bit density of the top and bottom tracks 204, 205, 200-202 define the BAR of the respective tracks.

Because individual recording heads and media will have different characteristics due to manufacturing tolerances, each drive may have different top and bottom BAR values that are optimum. In some cases, BAR may be different for different disk surfaces within a drive, and different for different zones within a disk surface. In A selected combination of laser power (LDI) and linear bit density (BPI) will produce a selected BAR for a particular recoding regions. Because LDI's effect on track width will also have an effect on adjacent track spacing (TPI), the value of TPI may also be defined together with the selected BAR. The combination of BPI and TPI defines the areal density (ADC) for the region being considered.

Figure 3:
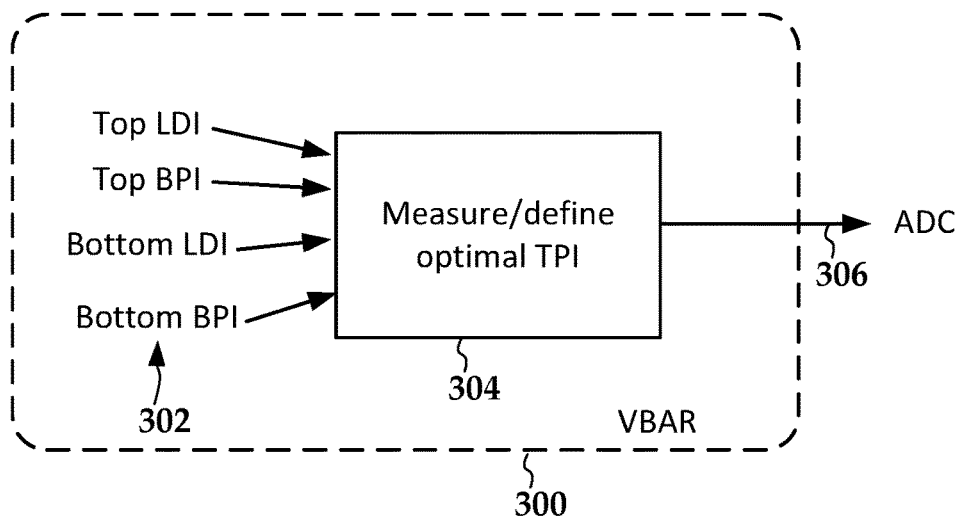
In FIG. 3, is a block diagram illustrating the variables of a factory drive bit-aspect-ratio calibration according to an example embodiment.

In FIG. 3, a block diagram illustrates the variables and results that may be considered in a factory drive VBAR calibration 300 according to an example embodiment. Input values 302 include LDI and BPI of the top tracks (referred to herein as $BPI_{top}$ and $LDI_{top}$) and LDI and BPI of the bottom tracks (referred to herein as $BPI_{bottom}$ and $LDI_{bottom}$). Using different values of $BPI_{top}$, $LDI_{top}$, $BPI_{bottom}$, and $LDI_{bottom}$, values of TPI for top and bottom tracks (referred to herein as $TPI_{top}$ and $TPI_{bottom}$) are found via processing block 304. The output of the processing block 304 is ADC 306, which includes a combination of $ADC_{top}$ and $ADC_{bottom}$ for the respective top and bottom tracks.

If it is assumed that $BPI_{top}$, $LDI_{top}$, $BPI_{bottom}$, and $LDI_{bottom}$ each could be set to one of ten different values, that would result in $10^4$ different combinations of inputs 302. At least one of those combinations should result in a maximum ADC 306 for a drive or region within a drive, however it may not be efficient to iterate through that many combinations for an individual drive. Therefore, a procedure is described below that can find a maximum ADC (or at least a local maxima) using a relatively smaller number of iterations, e.g., 30-40 iterations.

Figure 4:
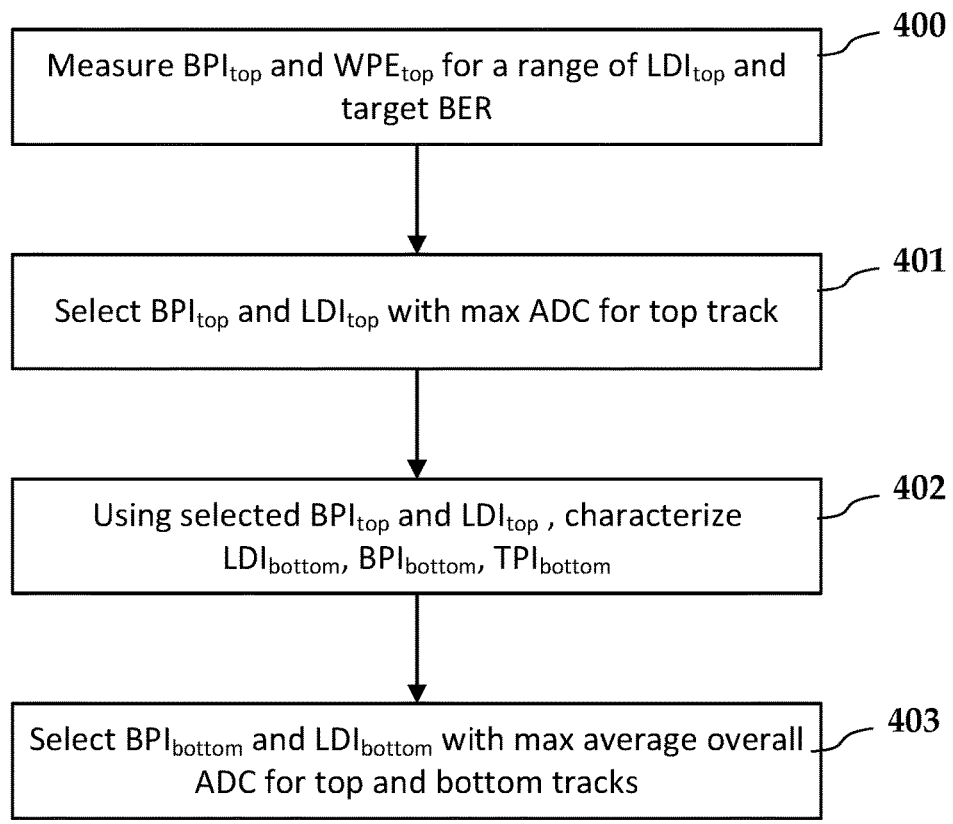
In FIG. 4, a flowchart shows a procedure according to an example embodiment.
Figure 5:
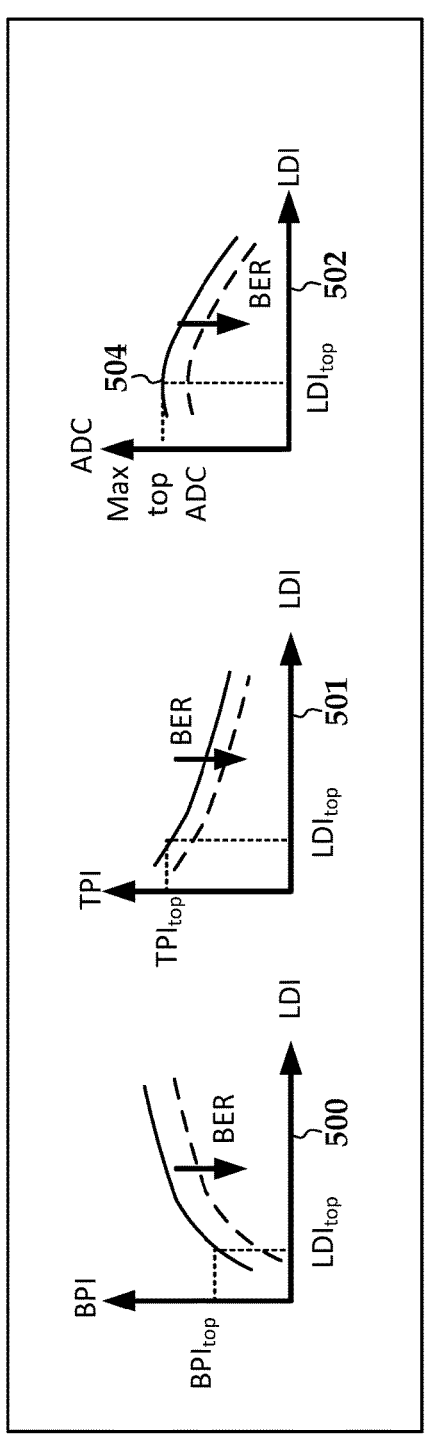
FIGS. 5 and 6 include sets of graphs showing relations between different parameters in a calibration according to an example embodiment.

In FIG. 4, a flowchart provides a high-level description of a procedure according to an example embodiment. Generally, different values of top BAR are found by measuring 400 $BPI_{top}$ and write plus erasure for the top track ($WPE_{top}$) that achieve a target BER over a range of $LDI_{top}$. The $WPE_{top}$ is an estimated measure of track write width using a constant repetitive data pattern and therefore can be used to derive $TPI_{top}$. Note that for this operation 400, the top tracks are written isolated from one another, sometimes referred to as non-squeezed writing of tracks. The relationship between BPI, TPI, and ADC as a function of LDI can be seen in the graphs 500-502 of FIG. 5. The curves in the graphs 500-502 indicate a measurement at a fixed BER, and the arrows in the graphs 500-502 indicate the trend of the curves as BER decreases.

As seen in graph 501, decreasing LDI increases TPI at a constant, target BER due to the smaller-sized hotspot enabling narrower tracks. To maintain the same BER, increasing TPI causes a decrease in BPI because narrower bits will generally need a greater linear length to be reliably read back. Therefore, the curve in graph 500 exhibits a decrease in BPI with decreasing LDI. Conversely, a wider track (which results from increased LDI and decreased TPI) can have shorter bits which results in greater BPI. The graph 502 shows how ADC is affected by LDI. The ADC at the target BER is a combination of the BPI and TPI characteristic shown in graphs 500 and 501, thus exhibits a local ADC maxima 504.

Figure 6:
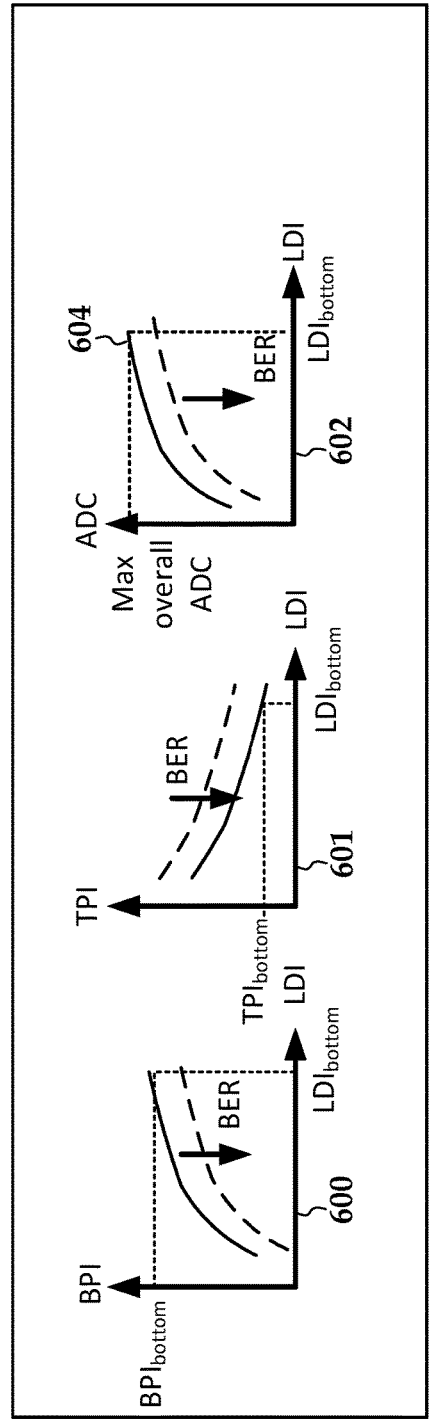

In reference again to FIG. 4, the measured values of $BPI_{top}$, $LDI_{top}$ are selected 401 that produce the maximum ADC 504 for the top track. The values of $BPI_{top}$ $LDI_{top}$ also define the BAR of the top track ($BAR_{top}$), because $LDI_{top}$ defines $TPI_{top}$, and BAR is a function of BPI and TPI. Next, as indicated in block 402, values of $LDI_{bottom}$, $BPI_{bottom}$, and $TPI_{bottom}$ are characterized based on the values of the $LDI_{top}$ and $BPI_{top}$ found at block 401. This is similar to the determination of ADC for the top tracks, and is shown in graphs 600-602 of FIG. 6. Unlike the top tracks, the bottom tracks are not written non-squeezed but are overwritten with the interlaced top tracks, the top tracks being written with the previously found $BAR_{top}$ that is results from $LDI_{top}$ and $BPI_{top}$. As such, the determination of the LDI bottom shown in graph 601 involves squeezing tracks together until a target BER is met, and so is performed differently than for the top tracks in graph 501. For example, test data can be written with increasingly smaller track pitch and the amount of squeeze the track can withstand is measured until a predetermined BER threshold is reached. The combination of $LDI_{top}$, $BPI_{top}$, $LDI_{bottom}$, and $BPI_{bottom}$ and are then found 403 that produce the maximum overall ADC ($ADC_{final}$) 604 for all of the tracks. The values of $LDI_{bottom}$, and $BPI_{bottom}$ will define $BAR_{bottom}$. Note that because the tracks are interlaced, the pitch of both the top and bottom tracks in the final configuration will be the same, namely corresponding to $TPI_{bottom}$.

Figure 7:
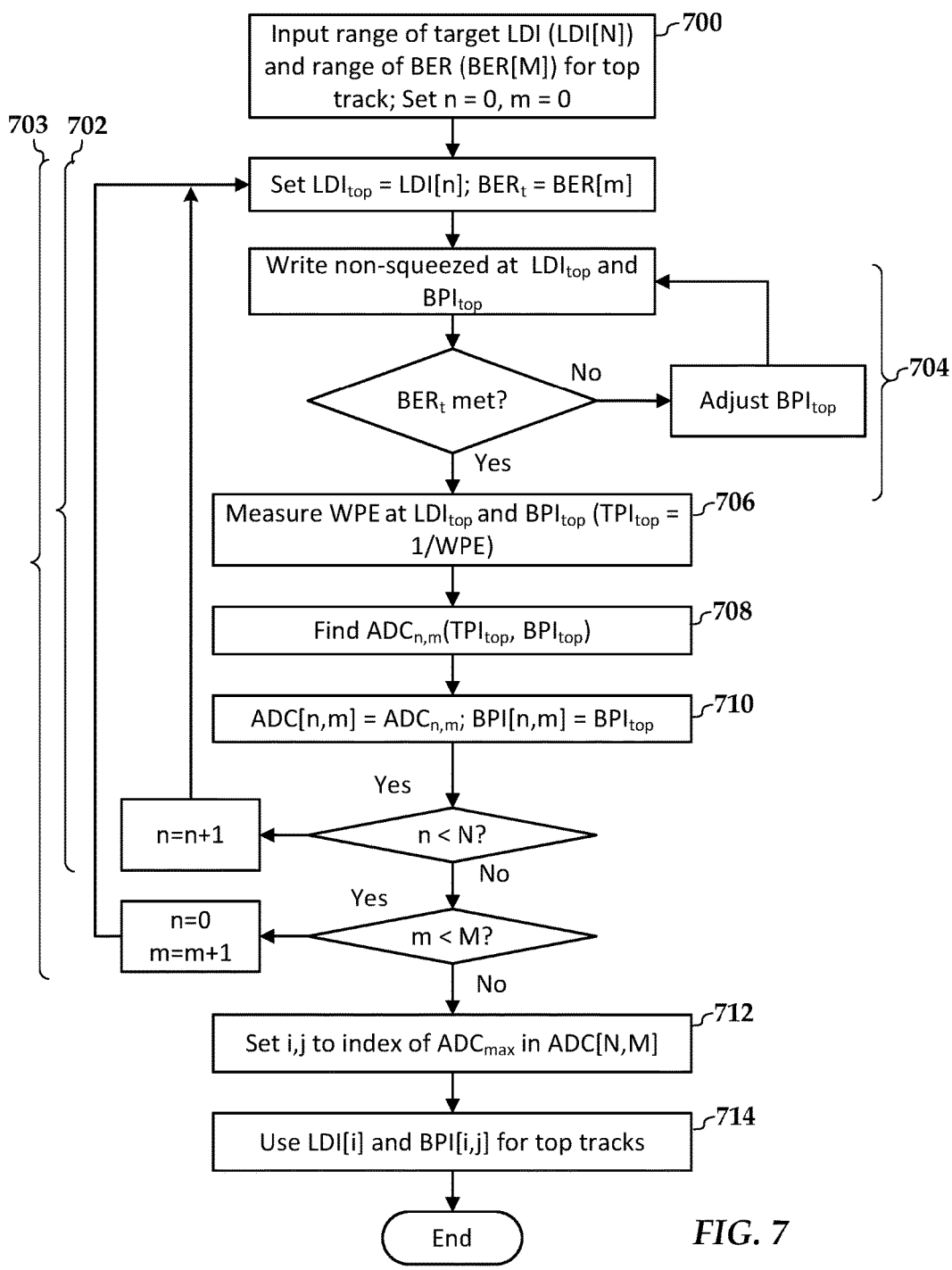
FIGS. 7 and 8 are flowcharts of procedures according to example embodiments.

In FIG. 7, a flowchart shows a procedure for finding $LDI_{top}$ and $BPI_{top}$ according to an example embodiment. At block 700, a target BER and a range of target LDI is determined. A range of target BER is also set. In this example, the LDI and BER ranges are arrays of LDI values of sizes N and M, although other structures or conventions could be used to iterate through this range. Blocks 703 represent an outer loop that iterates through each BER and blocks 702 represent an intermediate loop that iterates through each laser power. Blocks 704 are an inner loop that iterates through writing non-squeezed tracks with different BPI values at the current $LDI_{top,n}$ value until the target BER ($BER_t$) is met, the value of BPI being used as $BPI_{top}$ after exiting loop 704. The resulting TPI is found at block 706, which can be used together to find 708 the $ADC_{n,m}$ for this laser power $LDI_{top}$ and target $BER_t$. The values of $ADC_{top}$ and $BPI_{top}$ are added 710 to ADC[ ] and BPI[ ] arrays. This is repeated for additional values of $BER_t$.

Figure 8:
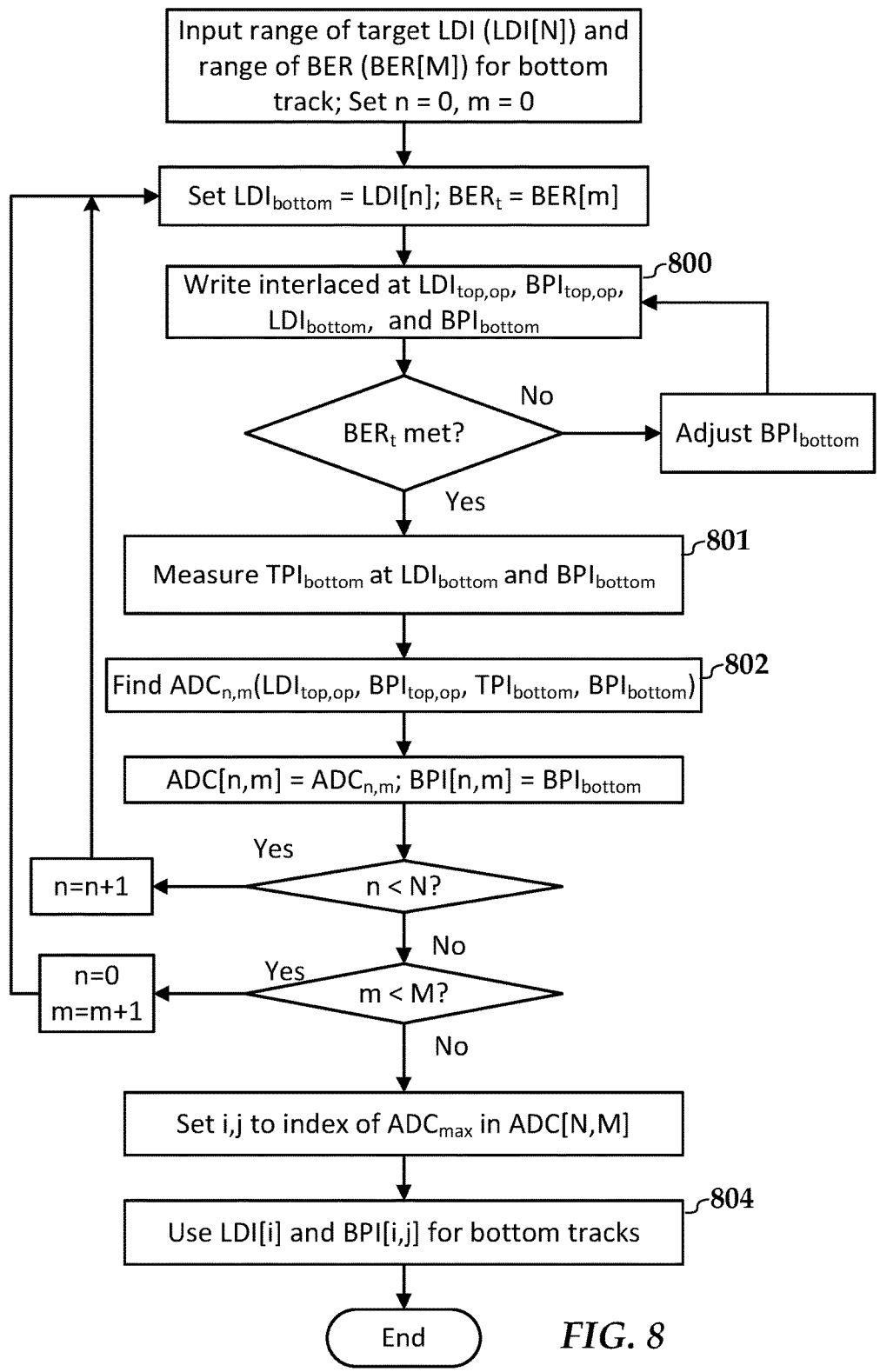

At the end of the outer loop 703, the maximum value of ADC is found 712 in the ADC[ ] array, and the indices i,j of this maximum value are used to set 714 $LDI_{top,op}$=LDI[i] and $BPI_{top,op}$=BPI[i,j], where the 'op' in the subscript indicates operational values of LDI and BPI. The values of $LDI_{top,op}$ and $BPI_{top,op}$ are then used in the flowchart of FIG. 8, which illustrates testing of the top tracks. In this flowchart, the procedure is substantially similar to that of FIG. 7, except that at block 800, the tracks are interlaced with top tracks, the top tracks being written with the values of $LDI_{top,op}$ and $BPI_{top,op}$ obtained in the flowchart of FIG. 7. Also, the $TPI_{bot}$ measured at block 801 is obtained by writing squeezed tracks instead of using WPE estimation and the ADC obtained at block 802 is for both bottom and top tracks. At the end of the outer loop in this example, $LDI_{bottom,op}$=LDI[i] and $BPI_{bottom,op}$=BPI[i,j] are set at block 804 and the calibration is complete.

While the above examples maximize the ADC for a range of top and bottom target BER, the procedures described above can be used in other ways. For example, for drives with higher targeted reliability in terms of BER, a range of target ADC could be set for the outer loops and the inner and intermediate loops could be used to find a maximum BER at this level of ADC. In addition, other types of parameters instead of just maximum ADC (or maximum BER) may be considered when making the choice, e.g., in block 712 in FIG. 7. For example, a range of maximum ADC in the ADC array may be analyzed (e.g., +−10% around the maximum) and an operating point within that range with another desired property, e.g., minimum laser power, may be selected if this point falls outside of the local maxima. In other variations, different target BER ranges could be used for the top and bottom tracks.

The selected BAR for the top and bottom tracks may be specific to a specific zone of the recording medium. For example, different zones may use different values of top and bottom track BAR. These different BAR may be selected to account for geometry (e.g., high or low skew), to alter performance (e.g., increase sequential throughput by maximizing BPI, using higher or lower BER targets), etc. Such differences may be end-user selectable, such that individual or all zones can field calibrated or re-calibrated with different BAR to change target performance characteristics.

Figure 9:
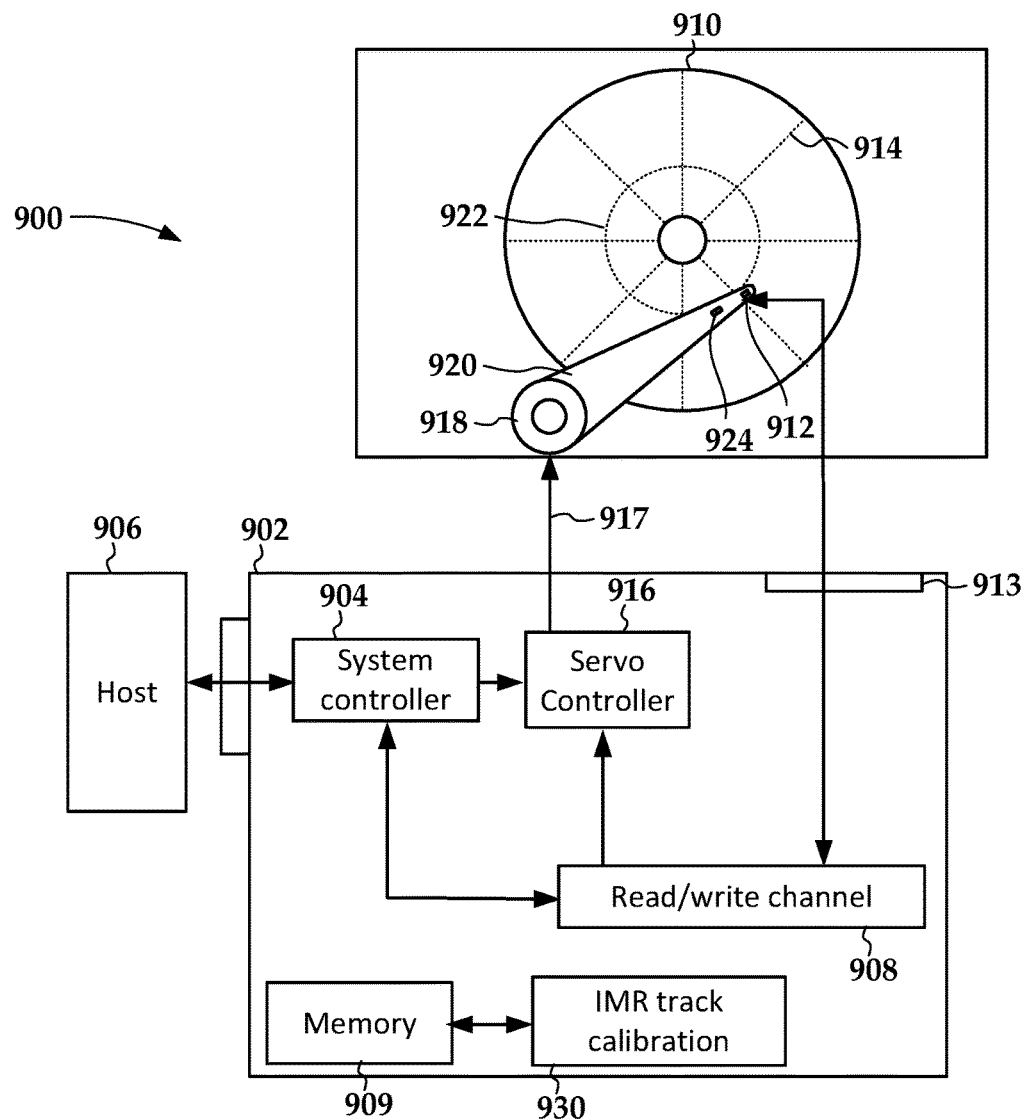
FIG. 9 is a block diagram of an apparatus according to an example embodiment.

In FIG. 9, a diagram illustrates components of a storage drive apparatus 900 that utilizes one or more read/write heads 912 according to example embodiments. The apparatus includes circuitry 902 such as a system controller 904 that processes read and write commands and associated data from a host device 906. The host device 906 may include any electronic device that can be communicatively coupled to store and retrieve data from a data storage device, e.g., a computer. The system controller 904 is coupled to a read/write channel 908 that reads from and writes to surfaces of one or more magnetic disks 910.

The read/write channel 908 generally converts data between the digital signals processed by the system controller 904 and the analog signals conducted through two or more HGAs 912 during read operations. At least one of the HGAs 912 includes two or more read transducers and may optionally include two or more write transducers. The read/write transducers may all be on the same slider body, or may be on two or more slider bodies that are commonly mounted to the same HGA 912.

The read/write channel 908 may include analog and digital circuitry such as decoders, timing-correction units, error correction units, etc. The read/write channel is coupled to the heads via interface circuitry 913 that may include preamplifiers, filters, digital-to-analog converters, analog-to-digital converters, etc.

The read/write channel 908 may have particular features that facilitate IMR reading and writing. For example, different channel configurations (e.g., parameters for write signals, decoding, timing correction, error correction, etc.)

may be used depending on whether a top or bottom track is currently being written/read. If the read/write head 912 includes multiple writers, the read/write channel 908 may send write data to multiple writers or to a selected subset of the writers during certain phases of write operations. The multiple writers may be of different type (e.g., HAMR, conventional) and may have different characteristics (e.g., crosstrack width, downtrack resolution, signal-to-noise ratio, skew, reader-to-writer offset, etc.) The read/write channel 908 may be configured to read and write data differently for different zones of disk 910. For example, some zones may use different writing formats such as shingled magnetic recording (SMR), IMR, and conventional tracks.

In addition to processing user data, the read/write channel 908 reads servo data from servo wedges 914 on the magnetic disk 910 via the read/write head. All of the multiple readers of the read/write head may be used to read servo data, or only a subset thereof. The servo data are sent to a servo controller 916, which uses the data to provide position control signals 917 to a VCM 918. The VCM 918 rotates an arm 920 upon which the read/write heads 912 are mounted in response to the control signals 917. The position control signals 917 may also be sent to microactuators 924 that individually control each of the read/write heads 912, e.g., causing small displacements at each head.

A IMR track calibration module 930 is operable to set VBAR characteristics in the factory in the field. In the factory, the IMR track calibration module 930 may be executed via or in response to a host 906 that is configured as a factory test apparatus. In other cases, the instructions for the IMR track calibration module may be stored and executed locally. Generally, the IMR calibration module 930 writes isolated test tracks to determine a first areal density $ADC_{top}$ for top tracks of the magnetic recording medium 910. The top tracks partially overlap and are interlaced with bottom tracks. The $ADC_{top}$ is determined as a function of a first track pitch $TPI_{top}$, first linear bit density $BPI_{top}$, and bit error rate $BER_{top}$ of the test tracks. A first combination of $TPI_{top}$ and $BPI_{top}$ is selected that results in a maximum value of $ADC_{top}$.

The IMR calibration module 930 then writes interlaced test tracks to find a second areal density $ADC_{bottom}$ of the bottom tracks as a function of second track pitch $TPI_{bottom}$, second linear bit density $BPI_{bottom}$, and target error rate $BER_{bottom}$ of the bottom tracks. The top test tracks of the interlaced test tracks are written at the first combination of $TPI_{top}$ and $BPI_{top}$. Based on the writing of the interlaced tracks, a second combination of $TPI_{bottom}$ and $BPI_{bottom}$ are selected that result in a maximum areal density for the top and bottom tracks. The first and second combinations are subsequently used to record data on the magnetic recording medium.

Figure 10:
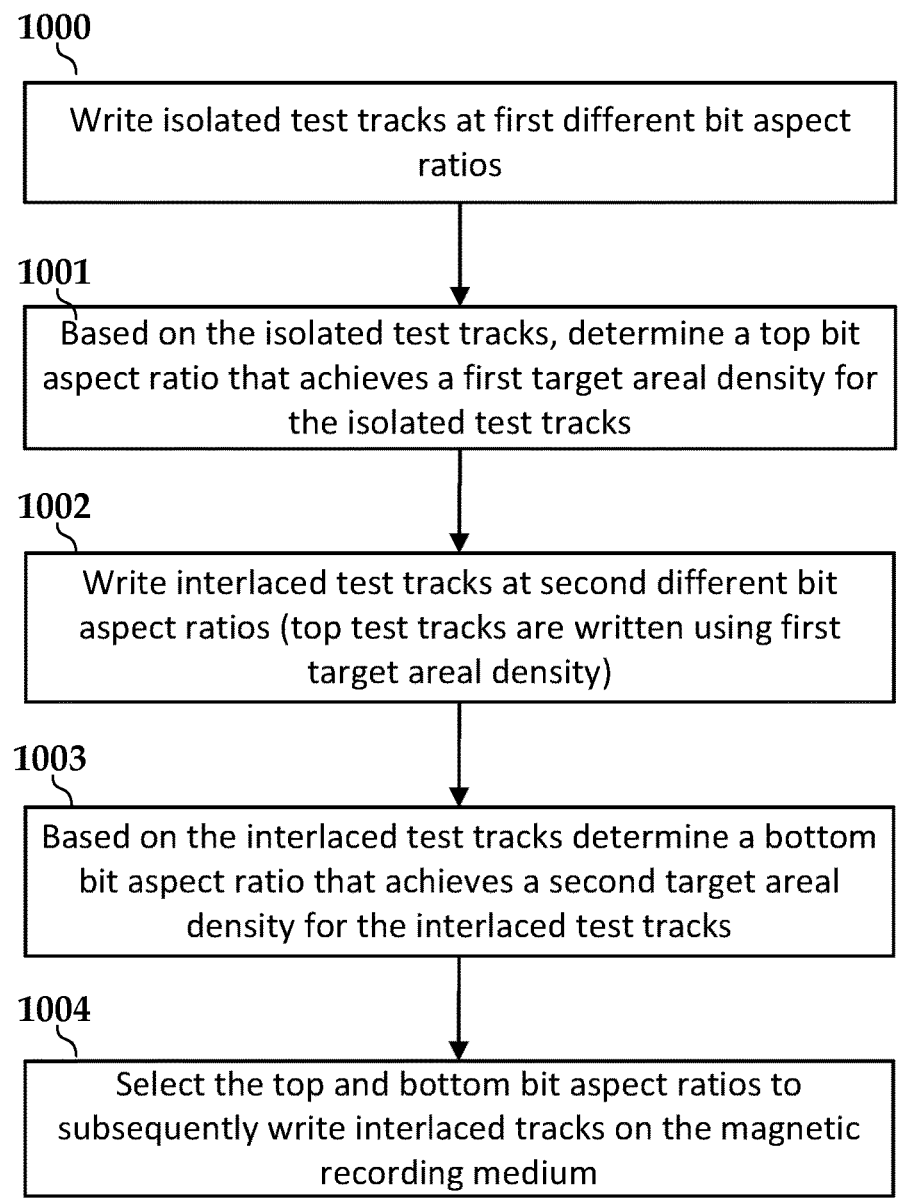
FIG. 10 is a flowchart of a method according to an example embodiment.

In reference now to FIG. 10, a flowchart illustrates a method of determining bit aspect ratios for interlaced tracks written to a magnetic recording medium according to an example embodiment. The interlaced tracks include top tracks that are written partially overlapping and interlaced with bottom tracks. The method involves writing 1000 isolated test tracks at first different bit aspect ratios. Based on the isolated tracks, a top bit aspect ratio that achieves a first target areal density for the isolated test tracks is determined 1001. Interlaced test tracks are written 1002 at second different bit aspect ratios. Top test tracks of the interlaced test tracks are written at the top bit aspect ratio. A bottom bit aspect ratio that achieves a second target areal density for the interlaced test tracks is determined 1002. The top and bottom bit aspect ratios found in this way are selected 1004 to subsequently write interlaced tracks on the magnetic recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method of determining bit aspect ratios for interlaced tracks written to a magnetic recording medium, the interlaced tracks comprising top tracks that are written partially overlapping and interlaced with bottom tracks, the method comprising:
  writing isolated test tracks at first different bit aspect ratios to determine a top bit aspect ratio that achieves a first target areal density for the isolated test tracks, a top track width of the first bit aspect ratios being determined by a write plus erase measurement;
  writing interlaced test tracks at second different bit aspect ratios to determine a bottom bit aspect ratio that achieves a second target areal density for the interlaced test tracks, top test tracks of the interlaced test tracks written at the top bit aspect ratio, a bottom track width of the second different bit aspect ratios being determined by writing squeezed tracks; and
  selecting the top and bottom bit aspect ratios to subsequently write interlaced tracks on the magnetic recording medium.

2. The method of claim 1, wherein the first and second target areal densities are maximum areal densities.

3. The method of claim 1, wherein the first different bit aspect ratios comprise different values of top track width and top linear bit density, and wherein the second different bit aspect ratios comprise different values of bottom track width and bottom linear bit density.

4. The method of claim 3, wherein the different top and bottom track widths are obtained by varying power applied to a laser that heats the magnetic recording medium during recording.

5. The method of claim 1, wherein the first different bit aspect ratios are obtained by varying power applied to a laser that heats the magnetic recording medium during recording and by changing a clock frequency of a magnetic writer signal.

6. The method of claim 1, wherein the first different bit aspect ratios are selected to achieve a first target bit error rate, and the second different bit aspect ratios are selected to achieve a second target bit error rate.

7. An apparatus, comprising:
  circuitry configured to communicate with a recording head that records data to a magnetic recording medium; and
  a controller coupled to the circuitry and configured to write, via the circuitry interlaced tracks to the recording medium, the interlaced tracks including top tracks that are written partially overlapping and interlaced with bottom tracks, the controller further configured to, via the circuitry:
    write isolated test tracks at first different bit aspect ratios to determine a top bit aspect ratio that achieves a first target areal density for the top tracks, a top track width of the first bit aspect ratios being determined by a write plus erase measurement
    write interlaced test tracks at second different bit aspect ratios to determine a bottom bit aspect ratio that achieves a second target areal density for the top tracks and the bottom tracks, a bottom track width of the second different bit aspect ratios being determined by writing squeezed tracks; and
    based on the writing of the interlaced tracks, select the top and bottom bit aspect ratios to subsequently write interlaced tracks on the magnetic recording medium.

8. The apparatus of claim 7, wherein the first and second target areal densities are maximum areal densities.

9. The apparatus of claim 7, wherein the first different bit aspect ratios comprise different values of top track width and top linear bit density, and wherein the second different bit aspect ratios comprise different values of bottom track width and bottom linear bit density.

10. The apparatus of claim 9, wherein the recording head includes a laser that heats the magnetic recording medium during recording.

11. The apparatus of claim 10, wherein the different top and bottom track widths are varied by varying power applied to the laser.

12. The apparatus of claim 10, wherein the first and second different bit-aspect ratios are obtained by varying power applied to the laser and by changing a clock frequency of a magnetic writer signal.

13. The apparatus of claim 7, wherein the first different bit aspect ratios are selected to achieve a first target bit error rate, and the second different bit aspect ratios are selected to achieve a second target bit error rate.

* * * * *